United States Patent Office 3,639,649
Patented Feb. 1, 1972

3,639,649
MANUFACTURE OF POLYAMIDE FOAMS USING AN OXYACID OF PHOSPHORUS
Harry McGrath, Raymond Frederick Moore, and Eric Smith, Manchester, England, assignors to Imperial Chemical Industries Limited, London, England
No Drawing. Filed Mar. 17, 1969, Ser. No. 807,973
Claims priority, application Great Britain, Mar. 29, 1968, 15,393/68
Int. Cl. C08g 53/10
U.S. Cl. 260—2.5 N                                      19 Claims

ABSTRACT OF THE DISCLOSURE

Production of nylon foam by heating a nylon above its working temperature with an oxyacid of phosphorus, e.g. orthophosphoric acid and a metal carbonate or bicarbonate, especially lithium carbonate.

---

This invention relates to the manufacture of polyamide foams.

The term polyamide refers to the thermoplastic polymers which are obtained by polycondensation of diamines with dicarboxylic acids, or self-condensation of amino acids or lactams. More particularly it refers to those linear polyamides which have fibre-forming characteristics and are termed "nylon." Specifically it includes:

polyhexamethylene adipamide (nylon 6:6)
polycaprolactam (nylon 6)
polydodecanolactam (nylon 12)
polyhexamethylenesebacamide (nylon 6:10)
polyhexamethylene isophthalamide (nylon 6:iP)
polyhexamethylene terephthalamide (nylon 6:T)
poly-metaxylylene adipamide (nylon MXD:6)

and copolymers therefrom.

According to the invention a process for the manufacture of a polyamide foam comprises heating a polyamide above its working temperature with a metal carbonate or bicarbonate and an oxy-acid of phosphorus.

Desirably the metal carbonate or bicarbonate should be in a finely divided state.

Although any metal carbonate or bicarbonate may be used in the process of the invention it is preferred to use carbonates which are themselves stable in the polyamide above its working temperature and evolve carbon dioxide through interaction with the oxy-acid of phosphorus. Specific examples of preferred carbonates are:

Carbonates of metals in Groups I–A and II–A of the Periodic system;
Carbonates of rare earth metals;
Carbonates or basic carbonates of gallium, indium, thallium, lead, manganese, iron, cobalt or nickel.

Especially preferred are sodium, potassium, calcium and above all lithium carbonates. Lithium carbonate is advantageous because it is only weakly basic.

Oxy-acids of phosphorus which may be used in the process of the invention include the following:

Hypophosphorous acid;
Alkyl phosphonous and dialkylphosphonous acids;
Phosphorous acid;
Alkyl-, cycloalkyl- and aryl-phosphonic acids and their monoalkyl, or monocycloalkyl and monoaryl esters;
Orthophosphoric acid;
Phosphoric acids having a lower $H_2O:P_2O_5$ ratio than orthophosphoric acid e.g. metaphosphoric acid, pyrophosphoric acid, hexametaphosphoric acid and trimetaphosphoric acid;
Partial esters of phosphoric acids with alcohols or phenols, e.g. diethyl orthophosphate and monoglycero-orthophosphate.

The extent of foaming which occurs during the process of the invention is predetermined by the amounts of phosphorus oxyacid and carbonates or bicarbonates which are caused to react in the molten polymer. Although it is not necessary to have the reactants present in stoichiometric amounts it is advantageous to at least utilise the full blowing power of the acid by having present a slight excess of the carbonate or bicarbonate can be used, the unreacted carbonate then acting as a filler. Subject to these preferences there may be used for example from 0.5 mole percent to 10 mole percent of oxy-acid of phosphorus and from 0.5 mole percent to 50 mole percent of carbonate or bicarbonate, based on the polyamide.

In one embodiment of the process of the invention the oxy-acid of phosphorus is first incorporated into the polyamide either by stirring it into the molten polyamide or by incorporation during polymerization. The metal carbonate or bicarbonate is added and mixed well in at a temperature just above that at which the polyamide solidifies. Foaming occurs when the resultant mixture is allowed to stand at said temperature and setting at the required density is accomplished by cooling below the solidification temperature.

In the process of the invention it is preferred to use a polyamide of high molecular weight since polyamides of low molecular weight have low melt viscosities which tend to render the foam unstable, and adequate build-up of molecular weight (and hence melt viscosity), through normal polycondensation is not achieved in the duration of the foaming process in the presence of the relatively large amounts of oxy-acid of phosphorus required to obtain an appreciable expansion. The best results are obtained by using a polyamide with a relative viscosity of at least 15 (as measured on an 8.4% w./w. solution in 90% formic acid).

To obtain an even textured foam it is advantageous to incorporate a surfactant with the polyamide, either initially, or after heating to the working temperature.

Suitable surfactants are long chain alcohols, e.g. cetyl alcohol and polyalkylene oxide condensates with long chain alcohols or phenols, for example the products sold by Imperial Chemical Industries Limited as Lubrol MOA and Lubrol E ("Lubrol" is a registered trademark.) Other additives can similarly be added, for example fillers, pigments, nucleants to assist crystallisation of the nylon and/or to assist bubble formation and plasticisers to reduce brittleness of the foam.

The properties of the foam can be improved by cross-linking the polyamide chains with suitable agents. The cross-linking may be effected by stirring suitable cross-linking agents into the molten polyamide, or by incorporating them during the polymerisation. Cross-linking agents for polyamides are well-known and include bishexamethylenetriamine, trimesic acid, bis-lactams, bis-epoxides and bis-isocyanates. The use of cross-linking agents is particularly advantageous in building up the viscosity of nylon polymers containing high proportions of phosphorus oxy-acids.

The process of the invention produces excellent foams and does not materially degrade the polyamide. The rigid polyamide foams produced are of high strength and have potential for use in the manufacture of a variety of light-weight load-bearing structures, for examples, in the building industry and in the production of furniture.

The invention is illustrated but not limited by the following examples in which the percentages unless otherwise stated are by weight:

EXAMPLE 1

Nylon 6:6 (25 g.) having a relative viscosity of 50 (as measured on a 8.4% solution in 90% formic acid/water), Lubrol MOA (0.5 ml.) and 80% orthophosphoric acid (0.39 ml., s.g. 1.6) were heated under nitrogen in a glass tube in a vapour bath at 280° C. until molten and then stirred for 10 minutes. Finely divided calcium carbonate (.07 g.) was added, the mixture stirred for 1 minute and the stirrer then removed whereupon foaming occurred immediately. After 1 minute heating was discontinued and the foam was allowed to cool. The foam had good texture and was of an excellent white colour, average density 0.14 g./cc.

Foams may be produced in similar manner from nylons 6, 12, 6:10, 6:iP, 6:T or MDX:6.

EXAMPLE 2

Example 1 was repeated except that only 0.4 g. of calcium carbonate was used. Foaming occurred during 4 minutes to give a foam with average density 0.2 g./cc.

EXAMPLE 3

Nylon 6:6 (200 g.), Lubrol MOA (4 ml.) and 80% orthophosphoric acid (2.5 ml.) were melted under nitrogen in a glass tube of diameter 10 cms. heated to 290° C. The temperature was lowered to 270° C. and the mixture stirred for 15 minutes. Powdered calcium carbonate (4 g.) was added and stirred in for 2 minutes before removing the stirrer. Foaming started at once; after 12 minutes the temperature was reduced to 240° C. and maintained for 30 minutes. The foam was allowed to cool to room temperature. The block of foam was of good texture and colour and had an average density of 0.18 g./cc.

In place of calcium carbonate in this example the following may be used: sodium carbonate, sodium bicarbonate, potassium carbonate, gallium carbonate, indium carbonate, thallium carbonate, lead carbonate, manganese carbonate, iron carbonate, cobalt carbonate, nickel carbonate, cerium carbonate.

EXAMPLE 4

Nylon 6.6 (25 g.). Lubrol MOA (0.5 ml.) and 50% aqueous hypophosphorous acid (0.4 ml.) were melted under nitrogen at 280° C. and stirred for 10 minutes before adding 0.5 g. powdered chalk. After stirring for 2 minutes the stirrer was removed and foaming allowed for 15 minutes before cooling. The foam obtained had an average density of 0.31 g./cc.

In place of hypophosphorous acid in this example there may be used phosphorous acid, orthophosphoric acid, metaphosphoric acid, pyrophosphoric acid, hexametaphosphonic acid, trimetaphosphoric acid or the mixture which is marketed as "polyphosphoric acid" and consists largely of tetraphosphoric acid $H_6P_4O_{13}$.

EXAMPLE 5

To a stirred mixture of molten nylon 6.6 (25 g.), Lubrol MOA (0.5 ml.) and cyclohexylphosphonic acid (0.5 g.) at 280° C. was added powdered calcium carbonate (0.5 g.). After stirring for 2 minutes the stirrer was removed, the mixture was allowed to foam for 20 minutes and then allowed to cool; it yielded a tough foam with average density 0.5 g./cc.

EXAMPLE 6

Nylon 6.6 (200 g.), Lubrol MOA (5 ml.), 80% orthophosphoric acid (2.5 ml.) and 2 g. of the mixed ortho and para isomers of N-ethyltoluenesulphonamide were melted under nitrogen and stirred at 275° C. for 20 minutes. Finely divided lithium carbonate (4 g.) was added, the mixture was stirred for 2 minutes and the stirrer was then removed. Foaming commenced immediately. After 3 minutes the temperature was lowered to 245° C. for 15 minutes before allowing the foam to cool to room temperature, average density of the foam was 0.11 g./cc.

EXAMPLE 7

Example 6 was repeated substituting finely divided anhydrous sodium carbonate for lithium carbonate. A fine textured white foam was obtained having average density 0.14 g./cc.

EXAMPLE 8

Nylon 6 polymer (25 g.), Lubrol MOA (0.5 ml.) and 80% orthophosphoric acid (0.32 ml.) were melted under nitrogen and stirred at 226° C. Powdered lithium carbonate (0.5 g.) was added, the mixture stirred for 1 minute and the stirrer removed, after 2 minutes the resulting foam was allowed to cool to room temperature.

EXAMPLE 9

Example 8 was repeated but using nlyon 6:10 in place of nylon 6. The resulting foam had good colour and texture with an average density of 0.2 g./cc.

EXAMPLE 10

A 60% aqueous solution of hexamethylene diammonium adipate (6:6 salt) containing 3.5 mole percent of orthophosphoric acid was polymerised using the pressure/temperature cycle described on page 125 of "Fibres from Synthetic Polymers" (Elsevier Publishing Co., 1953, edited by R. Hill), to give a nylon 6:6 polymer of R.V. 35. The polymer in chip form was dried at 100° C. in vacuo for 24 hours, then coated with 2% Lubrol MOA and 2% finely divided lithium carbonate by tumbling on a roller-mill. The coated chip was fed to a 2 cm. single screw extruder heated to 285° C. and the molten extrudate passed into a pre-heated metal mould at 265° C. When sufficient of the foaming composition to give the required foam density had been fed to the mould, the feed was diverted and the mould allowed to cool to room temperature. A block of foam was obtained with average density 0.22 g./cc.

By the technique described in the example foams may be made from other polyamides, including copolymers, the temperature being adjusted to suit the particular polyamide used.

We claim:

1. A process for the manufacture of a polyamide foam comprising heating a polyamide above its working temperature with an effective amount of a blowing agent containing an oxy-acid of phosphorus and a carbonate selected from the class consisting of metal carbonates and bicarbonates.

2. Process according to claim 1 wherein said carbonate is a metal carbonate which is stable in the polyamide above its working temperature and evolves carbon dioxide through interaction with the oxy-acid of phosphorus.

3. Process according to claim 1 wherein said carbonate is sodium carbonate.

4. Process according to claim 1 wherein said carbonate is potassium carbonate.

5. Process according to claim 1 wherein said carbonate is calcium carbonate.

6. Process according to claim 1 wherein said carbonate is lithium carbonate.

7. Process according to claim 1 wherein the oxy-acid of phosphorus is orthophosphoric acid.

8. Process according to claim 2 wherein the oxy-acid of phosphorus is orthophosphoric acid.

9. Process according to claim 3 wherein the oxy-acid of phosphorus is orthophosphoric acid.

10. Process according to claim 4 wherein the oxy-acid of phosphorus is orthophosphoric acid.

11. Process according to claim 5 wherein the oxy-acid of phosphorus is orthophosphoric acid.

12. Process according to claim 6 wherein the oxy-acid of phosphorus is orthophosphoric acid.

13. Process according to claim 1 wherein the amount of carbonate is in excess of the stoichiometric amount required for reaction with the oxy-acid of phosphorus.

14. Process according to claim 1 wherein the oxy-acid of phosphorus is first incorporated into the polyamide, the carbonate is then added to the polyamide and mixed therewith at a temperature slightly above that at which solidification occurs, the resultant mixture is allowed to stand at said temperature until foaming occurs and the foam is then cooled below the solidification temperature to cause setting.

15. Process according to claim 1 wherein a surfactant is incorporated with the polyamide.

16. Process according to claim 15 wherein the surfactant is a long chain alcohol.

17. Process according to claim 15 wherein the surfactant is a polyalkylene oxide condensate with a long chain alcohol or phenol.

18. Process according to claim 1 wherein a crosslinking agent for the polyamide is incorporated with the polyamide.

19. A process as set forth in claim 1 in which the amount of said oxy-acid of phosphorus is 0.5 to 10 mole percent based on the polyamide and the amount of said carbonate is 0.5 to 50 mole percent based on the polyamide.

References Cited

UNITED STATES PATENTS

| | | | |
|---|---|---|---|
| 2,582,228 | 1/1952 | Brinkema | 260—2.5 F |
| 3,037,951 | 6/1962 | Basto et al. | 260—2.5 N |
| 3,065,189 | 11/1962 | Becke et al. | 260—2.5 N |
| 3,151,192 | 9/1964 | Jacobs et al. | 260—2.5 E |
| 3,203,911 | 8/1965 | Goullioud | 260—2.5 N |
| 3,260,688 | 7/1966 | Watanabe et al. | 260—2.5 N |

JOHN C. BLEUTGE, Primary Examiner

U.S. Cl. X.R.

260—2.5 AE, 2.5 EP, 830 P